Patented May 15, 1945

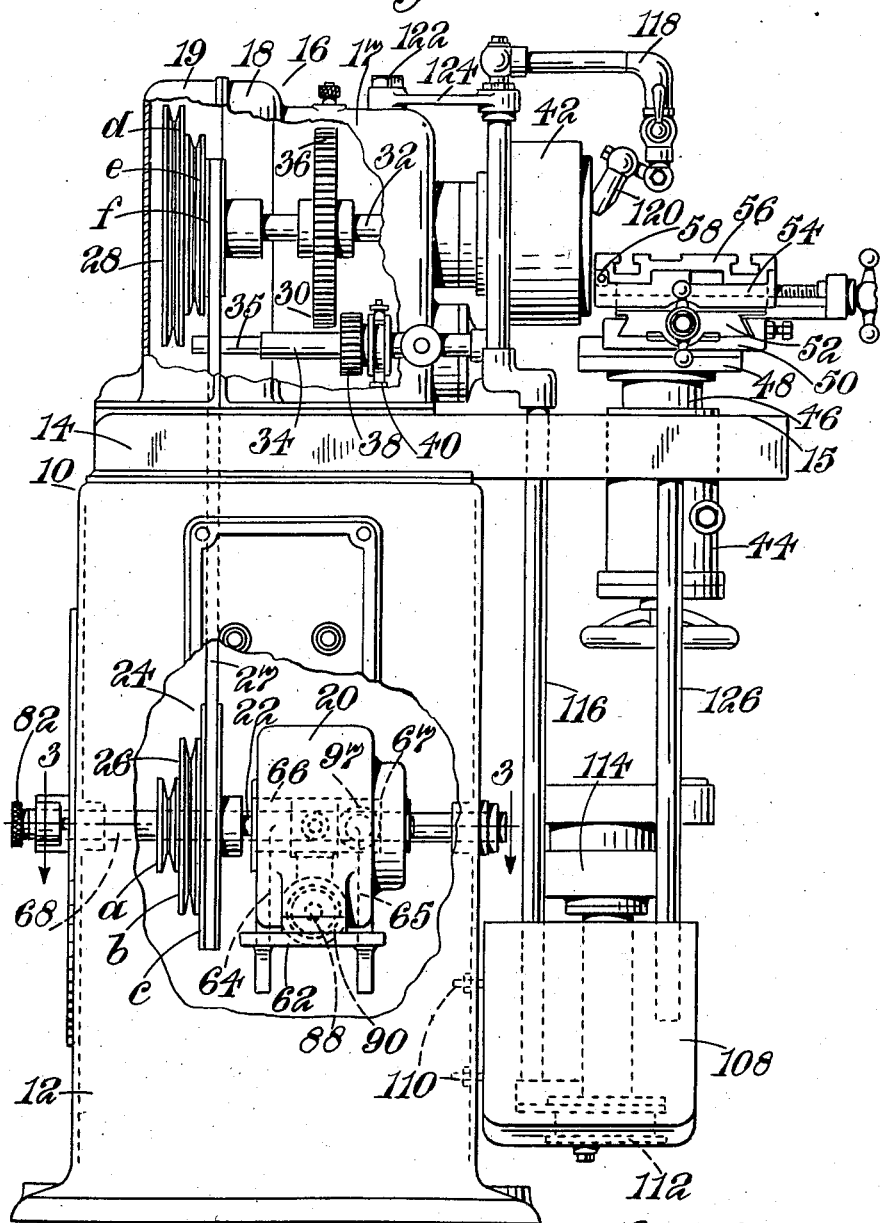

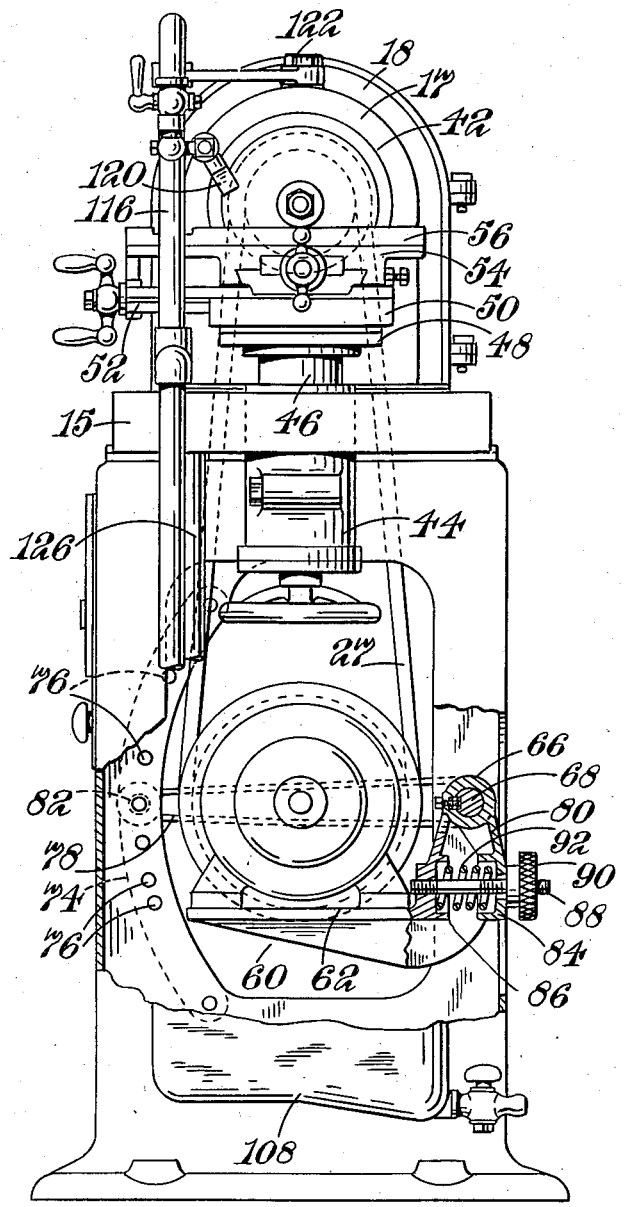

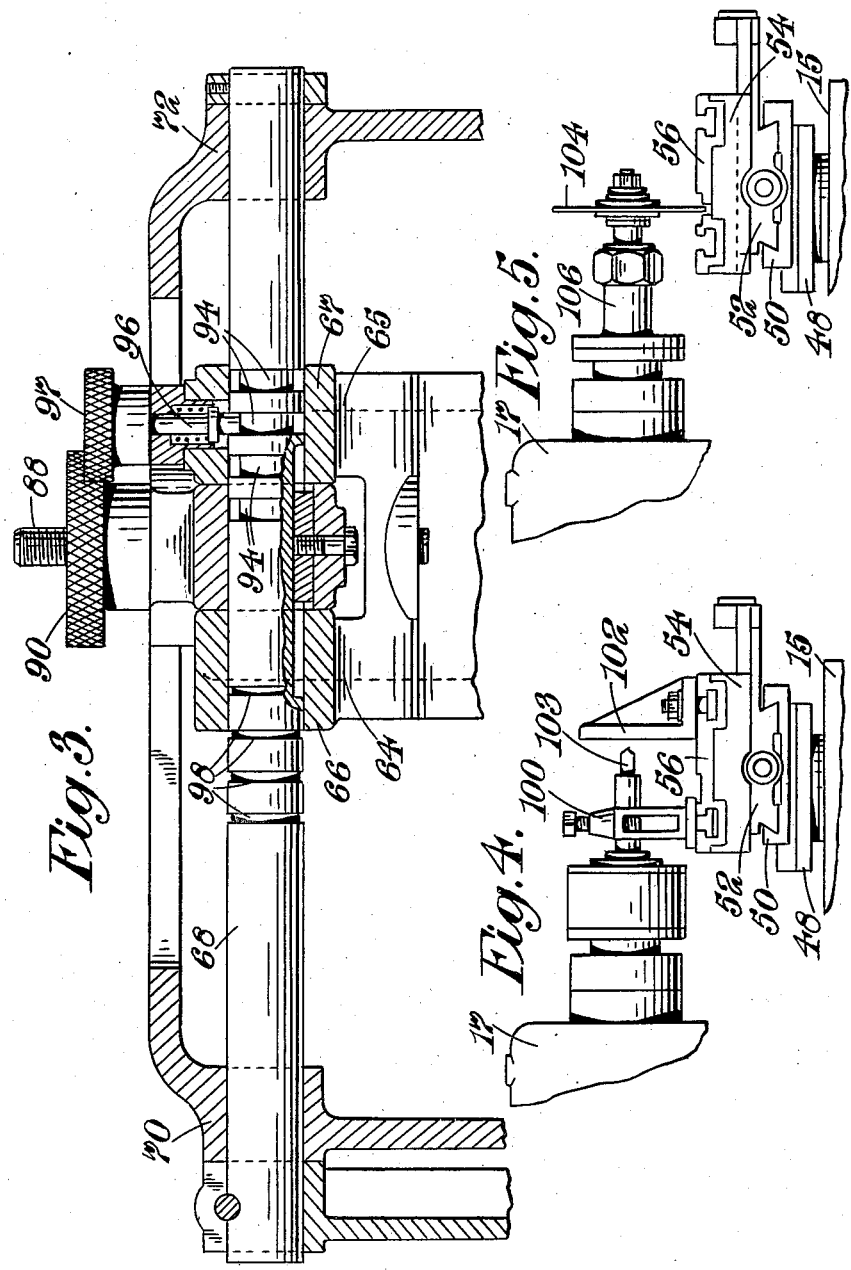

2,376,262

UNITED STATES PATENT OFFICE 2,376,262

MILLING, GRINDING, TURNING, OR OTHER MACHINE TOOL

Hugh Joseph Lorant and Adolf Sadger, London, England; said Sadger assignor to said Lorant Application November 18, 1943, Serial No. 510,796
In Great Britain October 5, 1942

5 Claims. (Cl. 74—242.13)

This application corresponds to the application of Hugh Joseph Lorant and Adolf Sadger, Serial No. 13926/42, which was filed in Great Britain on October 5, 1942.

This invention relates to milling, grinding, turning or other machine-tools of the type (hereinafter referred to as the type described) comprising a main frame having a table, a drive shaft journalled in the frame, a change-speed gearing driven by the drive shaft, and a driven shaft that is driven by the change-speed gearing and is arranged to rotate a member, such as a chuck for carrying a workpiece, or a rotary tool, such as a disc file.

Heretofore rotary machine-tools of the type described have been designed and used each for an individual purpose, and have each been made, for example, as (1) a cup-wheel grinder, or (2) as a face-milling and filing machine, or (3) as a second operation machine having a scroll chuck or collet chuck for use in subjecting a workpiece that has been machined once to a second operation, such as polishing its machined faces. In such machine-tools, the change-speed gearing has usually been constituted by a belt speeder comprising two cone-pulleys fast on the drive and driven shafts respectively, and an endless belt shiftable on the cone-pulleys, but it is found that for operating such grinders, filing machines and second operation machines, widely different speeds of the tools or workpieces are required which cannot be obtained by the belt-speeder alone.

It is an object of the present invention to obviate this drawback, and to provide an improved construction of machine-tool of the type described, which is adapted to be used selectively for a variety of different operations at a wide range of speeds.

According to the invention there is provided a machine-tool of the type described, comprising change-speed gearing in the form of a belt-speeder, characterised in that a second gearing, having a velocity ratio greater or less than unity, is associated with the belt-speeder and is arranged, when operative, to change the speed transmitted to the member, such as a chuck or rotary tool, by the driving shaft.

The second gearing may be arranged to operate selectively as a step-up or a step-down gearing, and to be driven by motion derived from the driven cone-pulley of the belt-speeder.

Preferably, the drive shaft is driven by, or forms part of, an electric motor and carries the lower cone-pulley of the belt-speeder that constitutes a pendulum suspension which, together with the motor, is so arranged that the distance between the axis of rotation of the drive and driven shafts can be readily varied for shifting the belt to obtain various speeds of transmission by raising and lowering the motor and drive shaft.

Provision may be made for readily adjusting the belt tension at the various positions of adjustment of the motor and consequent speeds of transmission, without changing the length of the endless belt of the belt-speeder.

The motor is preferably carried by a cradle, and a spring-loaded tension device may be arranged to raise and lower the cradle.

When the second gearing comprises a primary shaft, a secondary shaft and a final shaft, a pair of gear wheels on the primary and secondary shafts, and a pair of gear wheels on the final and secondary shafts, the primary shaft and the secondary shaft may be arranged to constitute selectively the driven shaft that is driven by the belt speeder.

The invention is diagrammatically illustrated by way of example in the accompanying drawings, wherein:

Figure 1 is a side elevation, partly broken away showing one form of machine-tool according to the invention provided with one form of work-holding attachment;

Figure 2 is an end elevation thereof, partly broken away, as viewed from the right-hand side of Figure 1;

Figure 3 is a horizontal section taken on the line 3—3 in Figure 1 but on a scale larger than that of Figures 1 and 2, and Figures 4 and 5 are detail side elevations showing other forms of work-holding attachments.

Like reference characters designate like parts throughout the several views.

Referring to the drawings, a machine-tool of the type described comprises a main frame designated generally 10, having a vertical hollow base-portion 12, a horizontal middle portion 14 that is carried by the latter, and has an end portion 15 extending therefrom to form an overhanging apron or bed, and a top portion in the form of a hollow head 16 comprising two compartments 17 and 18, 19 arranged side by side. The part 19 is a cover hinged to the part 18 of the compartment 18, 19. An electric motor 20, mounted as described hereinafter, is accommodated in the base-portion 12, and its armature shaft 22 carries at one end the lower cone-pulley 26 of a change-speed gearing in the form of a belt-speeder, designated generally 24, whereof the upper cone-pulley 28 is accommodated in the compartment 16 of the head, and is operatively connected to the lower cone-pulley by an endless belt 27. The cone-pulley 24 comprises three pulleys a, b and c, and the cone-pulley 28 comprises three pulleys d, e and f.

The compartment 17 of the head constitutes a gear case in which is accommodated a second gearing in the form of reduction gearing designated generally 30. This second gearing comprises a primary shaft 32, a secondary shaft 34, a gear wheel 36 fast on the primary shaft 32, and a pinion 38 that is slidable along the secondary shaft 34 and can be moved into and out of engagement with the gear wheel 36 by a shifting fork 40. The primary shaft 32 and the secondary shaft 34 are arranged to constitute selectively the driven shaft that is driven by the upper cone-pulley 28 of the belt-speeder 24, the outer end portions of which shafts are machined ready to take the pulley 28. For the purpose of facilitating this change of drive, the part 19 of the compartment 18, 19 containing the upper cone-pulley is formed as a hinged door for affording ready access to the compartment for removing the cone-pulley therein from the primary shaft 32 and placing it on the reduced end portion 35 of the secondary shaft 34 when it is desired to do so, and replacing it on the primary shaft. This primary shaft 32, which can thus be driven by the belt-speeder 24 either directly, or indirectly through the reduction gear 30, constitutes a final shaft that extends out of the head of the frame and is arranged to carry selectively various attachments, such as a chuck, e. g. a three-jaw chuck, or a collet chuck, a rotary face-milling or filing tool, or a grinding cup-wheel 42 or the like, and is adapted to be used for light turning and milling operations when employing suitable accessories. In some cases, the second gearing may be arranged to operate selectively as a step-up or a step-down gearing.

A column 44 is slidable along the bed 15, a pillar 46 is adjustable vertically in the volumn 44 and has a head 48 carrying a saddle 50 having a cross-slide 52 adjustable thereon; a top slide 54 is adjustable on the cross-slide and carries an inclinable work-holding table 56, which is preferably pivotally mounted to swing about a horizontal axis 58 that is situated at or near the end of the table adjacent the head of the machine and lies transversely of the direction of length of the shaft 32.

The armature shaft 22 of the electric motor 20 constitutes the drive shaft, and shifting mechanism is provided for raising and lowering the motor 20, drive shaft 22 and lower cone-pulley 26 bodily as a unitary structure for facilitating shifting the belt 27 on the cone-pulleys, and for lowering or raising the lower cone-pulley 26 according to whether the upper cone-pulley 28 is to be keyed on the lower shaft 34 or the upper shaft 32; means is also provided for holding the said unitary structure in its adjusted position according to the shift of the belt. In this way change in length of the endless belt 27 is obviated.

As illustrated, the motor 20 is carried by an L-shaped cradle, designated generally 60, and a spring-loaded belt-tensioning device, described hereinafter, is arranged to control the cradle which has a horizontal arm 62 in the form of a plate carrying the motor, and two vertical arms 64, 65 having hubs 66, 67 respectively, spaced apart one from another; these hubs are slidable along a spindle 68 that is journalled in two bearings 70, 72 on the base-portion 12 of the frame 10, as shown in Figure 3. The shifting mechanism for raising and lowering the cradle, and holding it in its position of adjustment, comprises an arcuate bar 74 having holes 76, e. g. eight thereof, arranged in spaced relation along the same, and a locking angle-lever 78, 80 pivotally mounted on the spindle 68 between the two hubs 66, 67 of the cradle. The longer arm 78 of this angle-lever carries at its end remote from the spindle 68 a sliding pin 82 to be inserted selectively into the holes 76 in the bar 74. The shorter arm 80 of the angle-lever has its end portion remote from the spindle 68 formed as a socket 84, which lies opposite to a socket 86 formed on the plate 62 of the cradle at a situation between its arms 64, 65. A pin 88 has one end screwed into the socket 86, and extends through a hole in the socket 84 and carries outside the latter an adjusting knob 90. A compression coil spring 92 is arranged surrounding the pin 88 between the two sockets 84 and 86. When the lever arm 78 is held by its pin 82 in any of the holes 76, the weight of the motor 20 on the cradle tends to rock its plate 62 downwards, which movement is resiliently arrested by the spring 92. By turning the knob 90 and varying the compression of the spring 92 the vertical position of the motor, and the load on the belt 27 due to the weight of the motor 20 can be varied. The belt-speeder 24 thus forms a pendulum suspension which, together with the motor 20, is so arranged that the distance between the axes of rotation of the drive shaft 22 and the driven shaft 32 or 34 can be readily varied.

Provision is made for shifting the drive shaft 22 and cone-pulley 26 thereon endwise for placing the steps a, b, c, of the lower cone-pulley 26 selectively opposite the steps d, e, f of the upper cone-pulley 28. As illustrated, the spindle 68 about which the cradle can rock has a plurality of arcuate peripheral grooves 94, e. g. four thereof, spaced apart along it, into which an adjustable stop 96 in the form of a spring-pressed plunger, having a knob 97, carried by the hub 67 of the cradle can be placed selectively. Indicating means for visibly indicating the position of the cradle 60 along the spindle 68 is also provided. This indicating means consists of a set of marks 98, e. g. four narrow annular grooves, that are arranged similarly to said arcuate grooves and are so placed in relation to one end of the hub 66 that a mark 98 nearest the hub-end at any time visually indicates the axial position of the lower cone-pulley 26 in relation to the upper cone-pulley 28. In this way, for each desired speed of rotation of the final shaft 32 the position of the motor, both vertically and horizontally, is fixed and visually indicated.

Assuming that it is desired to grind a workpiece, or to drive a workpiece in a chuck at a high speed, the primary shaft 32 will carry the grinding tool or chuck at one end, and the upper cone-pulley 28 at the other end, the reduction gearing will be disengaged, and the motor will be placed so that the upper cone-pulley 28 is driven at a maximum speed by the lower cone-pulley 26 with the endless belt connecting the speeds c and f, as shown in Figure 1.

If it is desired to drive a chuck or a tool, at a lower speed, then while the upper cone-pulley 28 still remains on the primary shaft 32, the speeds c—e or c—d may be used. If still lower speeds are required as when using a disc file, the reduction gear 30 may be used with the upper cone-pulley 28 detachably carried by the secondary shaft 34. Several such higher and lower speeds can be obtained according to the horizontal endwise position of the drive shaft 22 and the lower cone-pulley 26 and the consequent velocity ratio of the belt-speeder, because as each cone-pulley has three steps, the belt may be carried by various pairs of these steps, such as b—d, b—e, a—d and a—e, for giving different speeds when the upper cone-pulley is in its upper or lower position.

Figure 4 shows a work-holding attachment for use in turning, drilling and cutting keyways, and comprises a clamping post 100 on the table 56, which also adjustably carries a bracket 102 forming an abutment for the workpiece to be tooled by a tool 103.

Figure 5 shows another work-holding attachment for use in face grinding, gauge-grinding, cutting-off, slot-milling, slitting and like operations, comprising a rotary cutter 104 carried by a chuck 106 mounted on the head of the machine.

Particularly when the machine constitutes a grinder and comprises a cup-wheel 42 or other grinding tool, provision may be made for readily attaching to it a water-cooling apparatus. As shown in Figures 1 and 2, detachable water-cooling apparatus comprises a tank 108 that is arranged to be readily detachably attached to the base portion 12 of the frame, as by nut-equipped studs at 110, and contains a pump 112, e. g. a centrifugal pump, driven separately by an electric motor 114. This pump delivers water by a rising pipe 116 to a swivelling outlet pipe 118 that is situated on the head of the machine and has a delivery nozzle 120 to be directed on to the grinding or other tool and workpiece. The upper end of the pipe 116 is detachably secured at 122 by a link 124 to the compartment 17 of the head. When such water-cooling apparatus is to be used, the bed 15 preferably constitutes a tray, in which the used water can be collected and returned by a return pipe 126 depending from the tray to the tank 108.

It will be understood from the above that the described machine-tool is adapted to be used selectively for a variety of different operations at a wide range of speeds, and that by changing the gear ratio of the belt-speeder constituting one change-speed gearing, and disengaging or engaging the reduction gearing constituting a second gearing, the machine-tool can be readily used for various purposes, for example, as a cup-wheel grinder or as a face-milling and filing machine or as a second operation machine.

Various modifications may be made in the details of construction described above without departing from the invention. For example, the cone-pulleys 26 and 28 of the belt-speeder may have only two or more than three steps, and in some cases cones may be used instead of grooved pulleys. Also, instead of driving the machine electrically, it may be belt-driven. Further, the drive shaft 22 may be integral with the armature shaft of the electric motor, or may be a separate shaft coupled to it in any convenient manner.

We claim:

1. A machine tool comprising a main frame, a drive shaft situated in the frame, an electric motor for driving the drive shaft, a change-speed gearing in the form of a belt-speeder comprising an upper cone-pulley, and a lower cone-pulley mounted on the drive shaft, a driven shaft adapted to be driven by the upper cone-pulley, a second gearing that is adapted to be driven by the upper cone-pulley and is adapted to drive the driven shaft, which motor, drive shaft and lower cone-pulley form an unitary structure, shifting mechanism arranged to raise and lower the unitary structure for facilitating shifting the belt on the cone-pulleys, and holding means for holding the said unitary structure in its adjusted position according to the shift of the belt, which shifting mechanism comprises a cradle that carries the motor, and a spring-loaded tension device arranged to raise and lower the cradle, and the holding means comprises an arcuate bar having holes arranged in spaced relation along it mounted on the frame, a locking arm that has one end pivotally mounted on the frame and is operatively connected to the cradle, and a holding pin carried by the locking arm for insertion selectively into the holes in the bar.

2. A machine tool comprising a main frame, a drive shaft situated in the lower portion of the frame, a change-speed gearing in the form of a belt-speeder driven by the drive shaft, a second gearing having a velocity ratio different from unity adapted to be driven by the belt-speeder, and a driven shaft adapted to be driven selectively either directly by the belt-speeder or by the second gearing, which second gearing comprises a primary shaft, a secondary shaft, and a pair of gear wheels on the primary and secondary shafts, which primary and secondary shafts are arranged to constitute selectively the driven shaft that is driven by the belt-speeder.

3. A machine tool comprising a main frame, a drive shaft situated in the lower portion of the frame, a change-speed gearing in the form of a belt-speeder driven by the drive shaft, a second gearing having a velocity ratio different from unity adapted to be driven by the belt-speeder, and a driven shaft adapted to be driven selectively either directly by the belt-speeder or by the second gearing, which main frame comprises a head in which the second gearing is accommodated, which second gearing comprises a primary shaft, a secondary shaft, and a pair of gear wheels on the primary and secondary shafts, which primary and secondary shafts are arranged to constitute selectively the driven shaft that is driven by the belt-speeder, which primary shaft extends out of the head of the frame and is arranged to carry selectively a chuck or a tool.

4. A machine tool comprising a main frame, a drive shaft situated in the frame, an electric motor for driving the drive shaft, a change-speed gearing in the form of a belt-speeder comprising an upper cone-pulley, and a lower cone-pulley mounted on the drive shaft, a driven shaft adapted to be driven by the upper cone-pulley, a second gearing that is adapted to be driven by the upper cone-pulley and is adapted to drive the driven shaft, which motor, drive shaft and lower cone-pulley form an unitary structure, shifting mechanism arranged to raise and lower the unitary structure for facilitating shifting the belt on the cone-pulleys, and holding means for holding the said unitary structure in its adjusted position according to the shift of the belt, which shifting mechanism comprises a spindle that is carried by the main frame and lies parallel with the driving shaft, a cradle that carries the motor and is mounted to swing on said spindle, and a spring-loaded tension device for raising and lowering the cradle, which tension device comprises an angle lever that is mounted to rock on the spindle, a compression spring arranged between one arm of the lever and the cradle, and the holding means comprises an arcuate bar having holes arranged in spaced relation along it mounted on the frame, and a holding pin that is carried by the other arm of the lever for insertion selectively into the holes in the bar.

5. A machine tool comprising a main frame, a drive shaft situated in the frame, an electric motor for driving the drive shaft, a change-speed gearing in the form of a belt-speeder comprising an upper cone-pulley, and a lower cone-pulley mounted on the drive shaft, a driven shaft adapted to be driven by the upper cone-pulley, a second gearing that is adapted to be driven by the upper cone-pulley and is adapted to drive the driven shaft, which motor, drive shaft and lower cone-pulley form an unitary structure, shifting mechanism arranged to raise and lower the unitary structure for facilitating shifting the belt on the cone-pulleys, and holding means for holding the said unitary structure in its adjusted position according to the shift of the belt, which shifting mechanism comprises a spindle that is carried by the main frame and lies parallel with the driving shaft, a cradle that carries the motor and is mounted to swing on said spindle, and a spring-loaded tension device for raising and lowering the cradle, which tension device comprises an angle lever that is mounted to rock on the spindle, a compression spring arranged between one arm of the lever and the cradle, and the holding means comprising an arcuate bar having holes arranged in spaced relation along it mounted on the frame, and a holding pin that is carried by the other arm of the lever for insertion selectively into the holes in the bar, which spindle has a plurality of peripheral grooves arranged in spaced relation along it, a stop in the form of a spring-pressed plunger carried by the cradle is arranged to be placed selectively into said grooves, and indicating means is arranged to indicate the position of the cradle along the spindle.

HUGH JOSEPH LORANT.
ADOLF SADGER.